Figure 1:
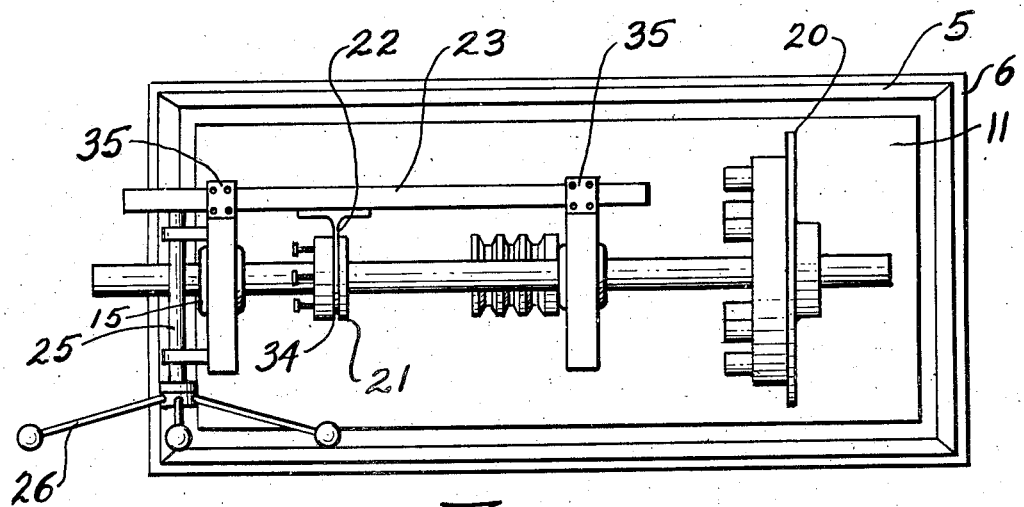

Sept. 10, 1946.  E. E. PETZOLD  2,407,512
MACHINE
Filed April 13, 1944  3 Sheets-Sheet 1

INVENTOR.
Earl E. Petzold
BY Earl E. Moore
ATTY.

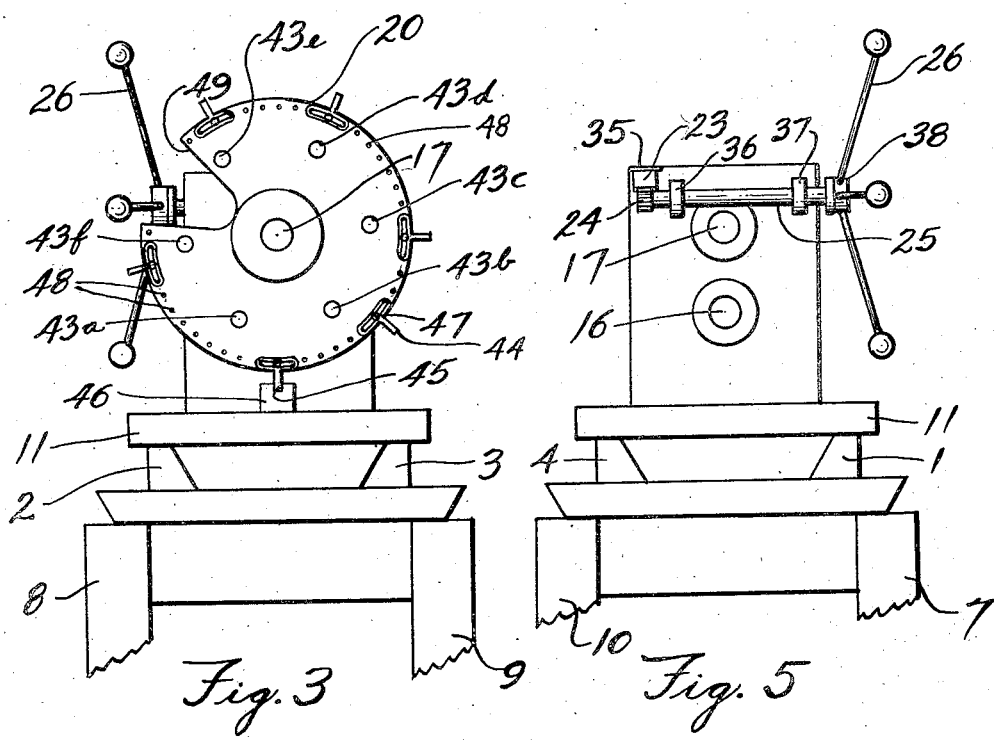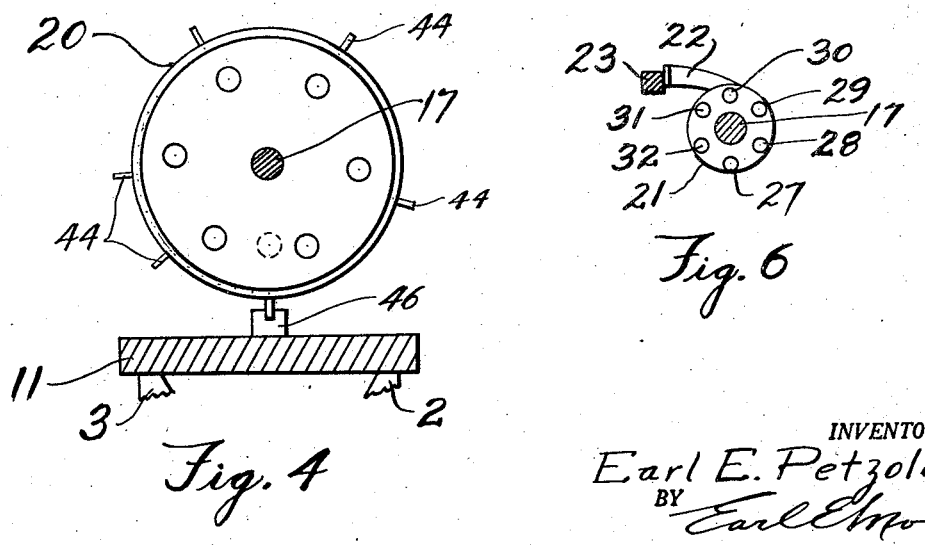

Sept. 10, 1946.   E. E. PETZOLD   2,407,512
MACHINE
Filed April 13, 1944   3 Sheets-Sheet 3

INVENTOR.
Earl E. Petzold
BY Earl E. Moore
ATTY.

Patented Sept. 10, 1946

2,407,512

UNITED STATES PATENT OFFICE 2,407,512

MACHINE

Earl E. Petzold, Burbank, Calif.

Application April 13, 1944, Serial No. 530,842

2 Claims. (Cl. 29—46)

This invention concerns lathes and similar apparatuses for shaping, milling, boring, drilling, threading, tapping, finishing and polishing various work pieces which may be bars, or materials of various kinds, forms, and configurations.

The invention comprises, in general, a regular power shaft having a clamping means for holding the work piece in combination with a rotary tool-holding-head in proximity thereto which has fixed thereon a plurality of various cutting and/or threading tools adapted to be brought into working relation with the work piece, means being provided for automatically stopping the progress of the cutting and/or threading tools in coordination with means for accurately guiding the tool-holding-head as each cut and/or thread is made. All the various elements of the device have sufficient size and form to make it dependable and speedy of operation without any violation of tolerable limits of precision.

One of the principal objects of the invention is to present a lathe or similar type of machinery that is strong and sturdy in construction, accurate in all cuts and threadings, and economical to make and manufacture.

Another object is to provide a speedy and accurate machine for cutting and threading materials, the machine not requiring the services of a trained mechanic when it is once set-up and ready for operation, all the cuts and threadings being accurately performed by unskilled help from the rough work piece to the finished product; said machine being readily adaptable for complete automatic operation.

Other objects, advantages and features of my invention will appear from the accompanying drawings, the subjoined detailed description, the preamble of these specifications and the appended claims.

Applicant is about to illustrate and describe one of the forms of his invention in order to teach one how to make and use the same, but it is to be understood that the drawings and description thereof are not to limit the invention in any sense whatsoever, except as limited by the appended claims.

Figure 2:
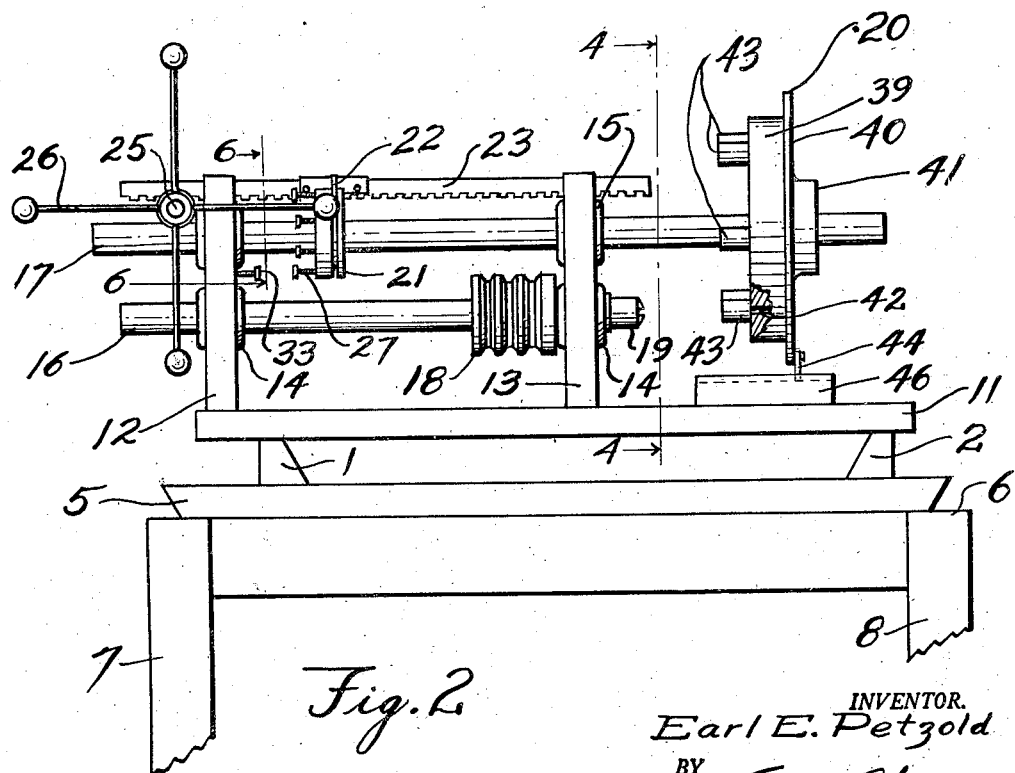
Figures 7, 8, 9:
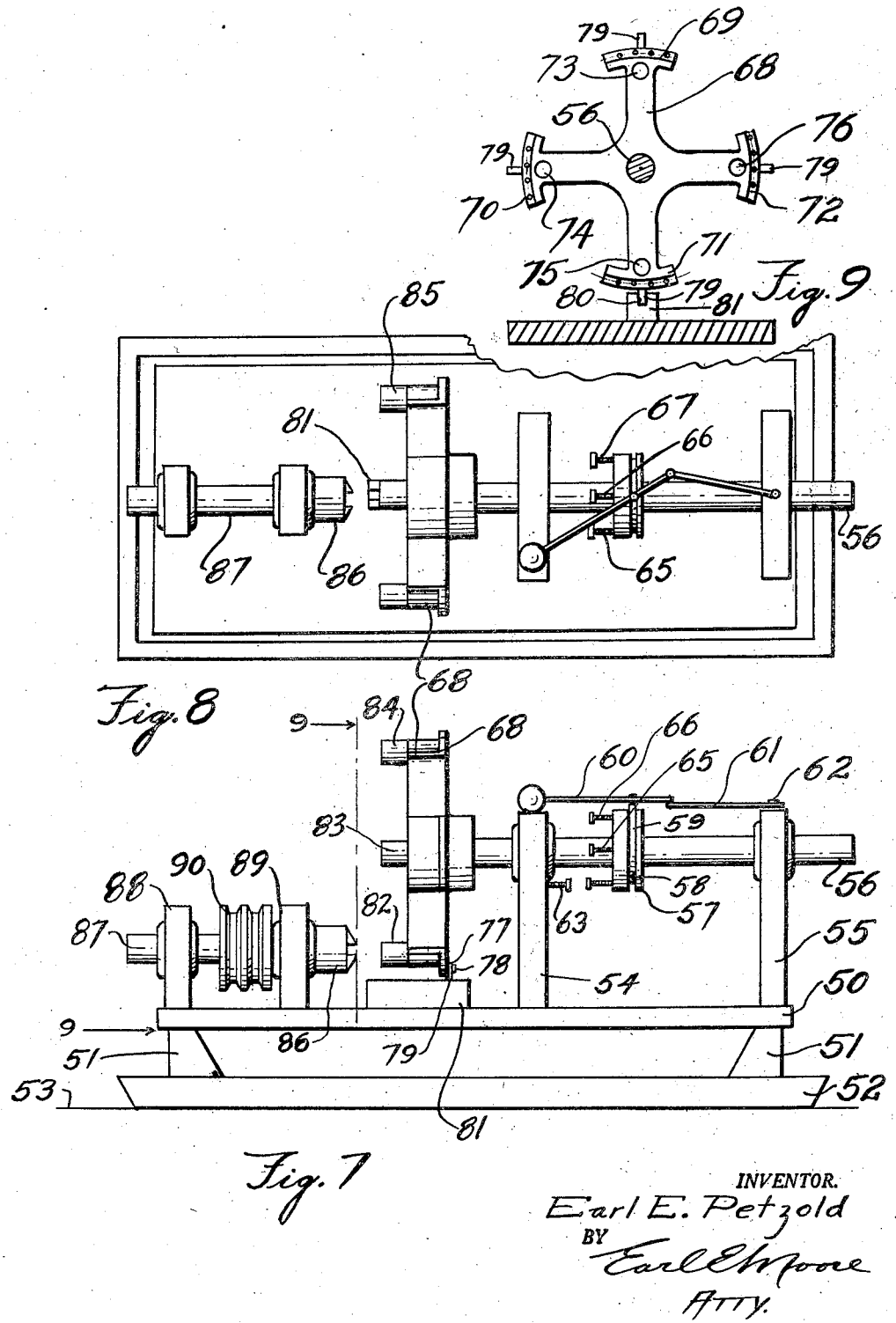

In the drawings:

Fig. 1 is a plan view of one form of the invention showing a lathe,

Fig. 2 is a side elevation of Fig. 1 with the bottom portion of the support broken away, Fig. 3 is a right end elevation of Fig. 1, Fig. 4 is a view taken substantially along the line 4—4 of Fig. 2, Fig. 5 is a left end elevation of Fig. 1, Fig. 6 is a view taken substantially along the line 6—6 of Fig. 2, Fig. 7 is a side elevational view of a modified form of the invention, Fig. 8 is a plan view of Fig. 7, Fig. 9 is a view taken substantially along the line 9—9 of Fig. 7.

The form of the invention shown in Figs. 1 to 6 inclusive, shows a lathe which is supported by the four corner legs 1 to 4, each of which rests in an oil pan 5, the pan being supported upon the table or bench top 6 which is supported above the floor of the shop by the four corner legs 7 to 10 inclusive.

The rectangular bed-plate or base plate for the lathe is shown at 11 which has securely fixed thereto, as by bolts or screws, the upright rectangular standards 12 and 13. The base-plate and the standards attached thereto would ordinarily be metal in order to give proper stability to the moving parts. Each standard has the two vertically alined bearing blocks or bushings 14 and 15, the lower blocks 14 accommodating the power-shaft or workshaft 16 which is keyed in its bushings, and the top blocks accommodating the subservient or tool-head supporting shaft 17. The work shaft is rotatable in its bearings and has the multiple pulley 18 keyed thereto, adapted to be connected by belt means to a source of power with variable speeds, and the chuck 19 screwed and set or keyed to the shaft which holds a work-piece, not shown, upon which cuts are to be made.

The top shaft 17 is rotatable and slidable in its bearing blocks and has keyed or otherwise fixed thereto near one end thereof a tool-holding head 20 which is readily shifted to the right or left by a mechanism comprising a stop-holding-sleeve 21, a bifurcated yoke or connector 22, rack 23, pinion gear 24, hand shaft 25 and hand bars 26. The stop-sleeve 21 is firmly fixed to the shaft 17 and has a plurality of tapped holes therein to accommodate a plurality of stop-elements or bolts 27, 28, 29, 30, 31 and 32, which are all adapted to be in a position, as the shaft is rotated, to engage the fixed stop bolt 33 which is screwed into a tapped hole on one side of the standard 12, as shown.

The stop-sleeve 21 has an annular groove 34 for snugly receiving the forks of the connector 22 so that the sleeve can smoothly ride between the forks and be shifted right or left by the forks when the rack 23 is forced in one direction or the other by the gear 24. The forks are fixed to one side of the rack by bolts or screws in an obvious manner. Guide-slideways are provided at the top corners of the standards and are provided with removable covers 35. The hand shaft 25 is journalled in the bearing blocks 36 and 37, as shown, and the shaft has keyed to the free end thereof a terminal hub 38 to which are screwed the ends of the handle bars 26.

Shifting of the shaft 17 by the manipulation of the handle bars 26, shifts the tool-head 20 which is firmly fixed to its shaft. The tool-head comprises a thick disc 39 integral with a thin disc 40 reenforced with a hub disc 41, all these discs being bored to snugly fit the shaft 17.

On one side face of the tool-head are a plurality of holes 42 arranged in a circular path about the center of the tool-head and are adapted to receive the chucks 43 which hold the various tools to be used upon the work piece which is firmly held by the chuck 19. The chucks 43 are placed in their proper holding holes or apertures 42, one of the holes 42 always being in a position to accommodate a chuck for its proper alinement with regard to the work-piece.

In order to hold the tool-head in a definite alined position while each one of its tools is being employed upon the work-piece, an index finger element 44 is provided, which element has a finger that is shaped and arranged to ride in a groove 45 upon a block 46 which is firmly fixed to the base-plate top 11 by bolts or screws. The finger element 44 is adjustably arranged upon one side face of the tool-head 20 in any one of the peripheral holes thereof and held therein by a bolt 47. The periphery of the tool-head has a large number of small tapped holes 48 thereupon, as shown, so that the element or elements 44 can all be positioned upon the periphery of the tool-head to accommodate the working position of the chucks 43. In order to provide a means for the longer pieces of the work to be readily positioned and removed from the chuck 19, a large opening 49 is provided, see Fig. 3.

*Operation*

The operation of the lathe just explained is as follows:

The multiple pulley wheel 18 is first provided with a belt for connection with a source of suitable power through a speed changing device, not shown, such a connection furnishing variable rotary motion of sufficient power to make all cuts and/or threads upon the work-piece in the chuck 19; such rotary motion being provided in either clockwise and/or anticlockwise direction.

It may be desired to first make a bore in the work-piece, therefore, the chuck 43a, for instance, would be provided with a proper sized drill bit, and this chuck is then brought into alinement with the work by rotating the tool-head 20, the tool-head being rotated until the finger just back of this chuck runs into the guide groove or slot 45. The said finger is pushed along the slot toward the work-piece by rotating the handle rods 26, and this movement continued until the hole is made and further inward motion of the drill is arrested by the adjusted stop-bolt striking the head of the fixed stop-bolt 33. By reversing the rotation of the handle rods 26, the drill is removed from the work-piece and the finger clears the guide-slot and thus allows the tool-head to be turned until the next tool is brought into alinement.

A reaming operation may be the next and second step to be performed upon the workpiece, therefore, the bore just drilled must be alined with the reamer by pushing the finger back of chuck 43b into the slot 45, which meant in this particular case about a 60° turn of the tool-head. By rotating the handle rods 26 in an anti-clockwise direction, the finger is pushed along the guide slot and the reamer made to do its work until the stop-bolt 28 arrests motion. It is unnecessary to test for alinement of the bore and the reamer, all that is necessary is to guide the finger at 43b into the guide groove while the handle bars 26 are moved in a counter clockwise direction. The reamer will move into the work only the distance predetermined by the proper setting of the stop-bolt 28.

After the reaming operation, the next and third step may be a rough outside cut upon the work piece, in which event, the tool-head is released in the aforesaid manner from the groove 45 and turned until the finger of the chuck 43c is moved into the guide-groove, which movement, when continued, will cause the cutter in the chuck 43c to rough cut the work piece until the stop-bolt 29 engages the head of the fixed stop-bolt 33.

The next and fourth step may be a finishing cut upon the work piece, and in the same manner aforesaid, the finger of chuck 43d is substituted for the finger of chuck 43c, and then the finishing cut is made until the stop-bolt 30 prevents further inward movement of the tool-head.

Another and fifth step may be a step-down cut and in which operation, as aforesaid, another cutter is brought into position by placing the finger of chuck 43e in the guide-groove, and the inward motion of this cutter continued until the stop-bolt 31 engages the fixed stop-bolt 33.

The final and sixth step, for instance, may be an undercut of a certain predetermined depth in accordance with the setting of the stop-bolt 32 which prevents further inward undercutting of the cutter in the chuck 43f, the finger of which chuck was substituted for the finger of chuck 43e in the guide-groove 45.

The above operation is just illustrative as to how the lathe might be tooled and arranged for some particular series of operations and various cuts, obviously, more or less chucks may be employed depending upon the number of operations upon the work piece. Every chuck has a finger for engagement in the guide-groove so as to properly aline the tool with the work, and each tool-chuck position has a stop-bolt in its proper position to engage the fixed stop-bolt 33 so as to limit the inward movement of the tools.

The work piece and/or tool-head need not be horizontal, as shown, as these parts may be vertical, or one part vertical and the other horizontal or at any desired angle to do the job.

Figs. 7, 8 and 9 show a modified form of the invention wherein a somewhat different type of tool-head is employed and a pull-lever means is installed to take the place of the rotary hand-bars.

In this form, the lathe has a base-plate 50 supported by four corner legs which are indicated in general by the reference character 51, the legs all resting in an oil pan 52; the oil pan resting upon any suitable surface indicated in general by 53 which may be a bench, shelf or floor.

At one top portion of the plate are the upright standards 54 and 55 which are bolted or otherwise fixed to the plate, and which journal the tool-head shaft 56, as shown. Keyed to this shaft is a sleeve 57 having an annular groove 58 to accommodate the bifurcated yoke element 59 which is free riding. This element has at the top thereof a pintle which hingedly supports a hand-lever 60 near one end thereof. The end of the hand-lever nearest the said pintle is hinged to one end of a pivot-rod 61 and the other end of which rod is pivoted at 62. By this arrangement, the shaft, while rotating, or not, can be shifted to the right or left by pushing or pulling the free end of the hand-lever 60.

The shaft 56 is limited in its inward movement by the fixed stop-bolt 63 which is arranged so as to engage any one of the adjusted stop-bolts 64, 65, 66 or 67 screwed into the side face of the sleeve 57, these parts being substantially the same as the like parts of the first described form of the invention.

Keyed to the inner end of the shaft 56 is the tool-head 68 which is somewhat different than the tool-head 20. The tool-head 68 is configurated in the form of spider-like frame having spokes. At the ends of the spokes are the finger-frame supports 69, 70, 71 and 72, as shown, and each spoke has a bore to accommodate a work tool, the bores being numbered 73, 74, 75 and 76. Upon the rear side of each finger-frame support is a finger-frame 77 held to its support by the screw-bolt 78. Each finger-frame has a finger 79 that rides in the guide-groove 80 of the block 81, said block being securely fixed to the base-plate by screw-bolts. Evenly spaced upon the working side of the tool-head are the tool-holding chucks 82, 83, 84 and 85, the shanks of which are securely bolted in their respective bores 73—76. Like the other form of the invention, the tool-head is reciprocated by working a hand device, but in this modified form of the invention, the hand device is a lever arrangement.

The work piece is held in a chuck 86 which is removably fixed to the end of the shaft 87 journalled to the upright standards 88 and 89, as shown, the standards being securely fixed to the top of the base-plate 50 as by screw bolts. Keyed to the shaft is a multiple pulley 90 which is adapted to be connected by a multiple pulley belt leading from a similar multiple pulley of a rotary speed changing device that is connected to a source of suitable power unit, the latter three parts not being shown, but well known to the art.

It is, of course, understood that various changes and modifications may be made in the details of form, style, design and construction of the whole or any part of the specifically described embodiment of this invention without departing from the spirit thereof, such changes and modifications being restricted only by the limitations clearly expressed in the following claims:

Having thus described my invention, what is claimed as new and desired to be secured by Letters Patent is:

1. In a lathe device and the like, a base plate having means extending therefrom for supporting and providing bearings for a pair of shafts and a toothed rack, a power shaft having at an end thereof means for holding a work piece, another shaft parallel with the power shaft and having a tool head fixed thereto near an end thereof, a toothed rack having means for reciprocating it, a flange-like sleeve fixed to the said another shaft and also to the rack, a stop element supported by the base facing said sleeve, a plurality of adjustable stop pins about the periphery of the sleeve positioned so that any one of the stop pins can make contact with the stop element, a grooved block fixed to the base beneath the tool head, a plurality of fingers around the periphery of the tool head adapted to enter the grooved block and guide the tool head in a predetermined path.

2. In a lathe machine and the like, a base plate having standards extending therefrom, a pair of parallel shafts journalled in the standards, one of the shafts having means at an end thereof for holding a work piece and the other shaft having a tool head keyed thereto with a plurality of tool holding means around the periphery thereof, a sleeve-like means fixed to the shaft having the tool head which is provided with a plurality of adjustable pins, manual means for reciprocating the shaft with the tool head, a stop element extending from one of the standards and in position to be contacted by one of the pins, a block beneath the tool head and fixed to the base, a groove along the top surface of the block, a plurality of adjustable fingers extending from the tool head about the periphery thereof, said fingers being arranged so that any one of them can enter the groove of the block and guide the tool head toward the means for holding a work piece.

EARL E. PETZOLD.